US011888726B2

(12) United States Patent
Wang et al.

(10) Patent No.: US 11,888,726 B2
(45) Date of Patent: *Jan. 30, 2024

(54) PATH ESTABLISHMENT METHOD AND CONTROLLER

(71) Applicant: HUAWEI TECHNOLOGIES CO., LTD., Shenzhen (CN)

(72) Inventors: Fengmei Wang, Beijing (CN); Yong Long, Shenzhen (CN); Xia Chen, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/976,600

(22) Filed: Oct. 28, 2022

(65) Prior Publication Data

US 2023/0269173 A1   Aug. 24, 2023

Related U.S. Application Data

(63) Continuation of application No. 16/937,236, filed on Jul. 23, 2020, now Pat. No. 11,502,937, which is a
(Continued)

(30) Foreign Application Priority Data

May 10, 2016  (CN) .......................... 201610307327.2

(51) Int. Cl.
*H04L 45/16* (2022.01)
*H04L 45/121* (2022.01)
*H04L 12/18* (2006.01)
(Continued)

(52) U.S. Cl.
CPC .............. *H04L 45/16* (2013.01); *H04L 12/18* (2013.01); *H04L 12/1854* (2013.01);
(Continued)

(58) Field of Classification Search
CPC ... G08B 13/19656; G08B 25/08; H04L 12/46; H04L 67/1095; H04L 67/12;
(Continued)

(56) References Cited

U.S. PATENT DOCUMENTS 9,571,387 B1    2/2017  Atlas et al.
10,554,543 B1 * 2/2020  Paul ...................... H04L 47/125
(Continued)

FOREIGN PATENT DOCUMENTS

CN    102142969 A    8/2011
CN    103595631 A    2/2014
(Continued)

OTHER PUBLICATIONS

Sivabalan et al., "PCEP Extensions for Segment Routing, draft-sivabalan-pce-segment-routing-03.txt." Internet Engineering Task Force, Reston, Virginia (Jul. 3, 2014).

*Primary Examiner* — Habte Mered
(74) *Attorney, Agent, or Firm* — Leydig, Voit & Mayer, Ltd.

(57) ABSTRACT

A path establishment method and a controller are disclosed. The method includes: when detecting a path establishment request for establishing P2MP TE, computing a P2MP TE path by using head node information and tail node information included in the path establishment request; identifying a target branch node in the P2MP TE path, and obtaining a label of the target branch node; and when a third node corresponding to the head node information and the target branch node are not a same node, sending first information to the third node, and sending second information to the target branch node, where the second information is used to instruct the target branch node to generate a multicast forwarding entry. Embodiments of this application can reduce complexity of establishing the P2MP TE path.

20 Claims, 8 Drawing Sheets

Related U.S. Application Data continuation of application No. 16/185,994, filed on Nov. 9, 2018, now Pat. No. 10,749,788, which is a continuation of application No. PCT/CN2016/108233, filed on Dec. 1, 2016.

(51) Int. Cl.
*H04L 47/125* (2022.01)
*H04L 45/125* (2022.01)
*H04L 45/64* (2022.01)
*H04L 45/50* (2022.01)

(52) U.S. Cl.
CPC .......... *H04L 45/121* (2013.01); *H04L 45/125* (2013.01); *H04L 45/64* (2013.01); *H04L 47/125* (2013.01); *H04L 45/50* (2013.01)

(58) Field of Classification Search
CPC ... H04L 67/2823; H04L 67/025; H04L 67/42; H04L 12/4625; H04W 88/16; H04W 84/12; H04N 21/2743; H04N 21/43615; H04N 21/413; H04N 21/2747
See application file for complete search history.

(56) References Cited

U.S. PATENT DOCUMENTS

| | | |
|---|---|---|
| 2014/0003229 A1 | 1/2014 | Gandhi et al. |
| 2014/0098713 A1 | 4/2014 | Beckhardt et al. |
| 2014/0211615 A1 | 7/2014 | Murphy et al. |
| 2016/0234107 A1 | 8/2016 | Yin et al. |
| 2017/0012859 A1 | 1/2017 | Ye et al. |
| 2018/0102965 A1 | 4/2018 | Hari et al. |
| 2019/0273679 A1 | 9/2019 | Zhao et al. |

FOREIGN PATENT DOCUMENTS

| | | |
|---|---|---|
| CN | 103688497 A | 3/2014 |
| CN | 103873378 A | 6/2014 |
| CN | 104579966 A | 4/2015 |
| CN | 105337785 A | 2/2016 |
| CN | 105827529 A | 8/2016 |
| EP | 3038303 B1 | 9/2018 |
| WO | 2011160498 A1 | 12/2011 |

\* cited by examiner

```
<PCLabelUpd Message> ::= <Common Header>
                         <pce-label-update-list>
  Where:
  <pce-label-statck-update-list> ::= <pce-label-update>
                                     [<pce-label-update-list>]
  <pce-label-update> ::= (<pce-label-download> | <pce-label-map> | <pce-p2mp-labe-download>)
  Where:
  <pce-label-download> ::= <SRP>
                           <LSP>
                           <label-list>
  <pce-label-map> ::= <SRP>
                      <LABEL>
                      <SR-ERO>
  <label-list> ::= <LABEL>
                   [<label-list>]
  <pce-p2mp-labe-download> :: = <SRP>
                                <LSP>
                                <LABEL>
                                <label-statck-list >
  where:
  <label-statck-list> :: = <LABEL-STATCK>
                           [<1abel-statck-list>]
```

FIG. 8

PATH ESTABLISHMENT METHOD AND CONTROLLER

CROSS-REFERENCE TO RELATED APPLICATIONS

This application is a continuation of U.S. patent application Ser. No. 16/937,236 filed on Jul. 23, 2020, which is a continuation of U.S. patent application Ser. No. 16/185,994, filed on Nov. 9, 2018, now U.S. Pat. No. 10,749,788, which is a continuation of International Application PCT/CN2016/108233, filed on Dec. 1, 2016, which claims priority to Chinese Patent Application No. 201610307327.2, filed on May 10, 2016. All of the aforementioned applications are hereby incorporated by reference in their entireties.

TECHNICAL FIELD

Embodiments of this application relate to the field of communications technologies, and in particular, to a path establishment method and a controller.

BACKGROUND

Point-to-multipoint traffic engineering (P2MP TE) implements a multicast service by establishing a "tree shape" path (that is, a tunnel) from a head node (that is, an ingress node) to a plurality of tail nodes (that is, egress nodes). It can be learned that path establishment is an indispensable process for implementing the multicast service by the P2MP TE. Currently, a node in the P2MP TE supports the Resource Reservation Protocol (RSVP). Therefore, when a path is established, a head node needs to collect information about all nodes in a P2MP TE network by using a refresh message in the RSVP. When information about a node is changed, the head node needs to notify the changed information to all the nodes in the P2MP TE network by using a refresh message. Such a manner of establishing the P2MP TE makes a path establishment process complex, and is disadvantageous to network management and maintenance.

SUMMARY

Embodiments of this application disclose a path establishment method and a controller, so as to reduce complexity of establishing a P2MP TE path.

According to a first aspect, a path establishment method is disclosed. The method is applied to a controller that manages at least three nodes, and each of the at least three nodes has a multiprotocol label switching (MPLS) forwarding function and a segment routing (SR) function. When a path establishment request that is for establishing P2MP TE and that includes head node information and tail node information is detected, a P2MP TE path is computed by using the head node information and the tail node information. To be specific, a path from a head node to a plurality of tail nodes is computed. Then, a target branch node in the P2MP TE path is identified, and a label of the target branch node is obtained. When a third node corresponding to the head node information and the target branch node are not a same node, first information is sent to the third node, and second information is sent to the target branch node. The P2MP TE path includes at least one branch node and at least two tail nodes. The target branch node is connected to at least a first node and a second node. The first node is a first tail node or a node between the target branch node and the first tail node. The second node is a second tail node or a node between the target branch node and the second tail node. The first tail node and the second tail node are nodes in the at least two tail nodes. The target branch node is any one of the at least one branch node. The first information may include the label of the target branch node and information about a path from the third node to the target branch node in the P2MP TE path. The first information may be used to instruct the third node to encapsulate the path information and the label of the target branch node in a first packet when receiving the first packet. The path information may be used to instruct the third node to forward the encapsulated first packet based on the path information. The second information may be used to instruct the target branch node to generate a first multicast forwarding entry. The first multicast forwarding entry may include information about a path from the target branch node to a node corresponding to the tail node information in the P2MP TE path. The first multicast forwarding entry may be used by the target branch node to forward the first packet based on the first multicast forwarding entry when receiving the first packet including the label of the target branch node.

In an embodiment, when the third node corresponding to the head node information and the target branch node are a same node, the controller sends third information and the label of the target branch node to the target branch node. The label of the target branch node may be used to instruct the target branch node to generate a second multicast forwarding entry based on the third information. The second multicast forwarding entry may include information about a path from the target branch node to a node corresponding to the tail node information in the P2MP TE path. The second multicast forwarding entry is used by the target branch node to forward a second packet based on the second multicast forwarding entry when receiving the second packet. In this way, the P2MP TE path can be established regardless of a specific location of the branch node in the path.

In an embodiment, a label pre-allocated to a branch node may be stored in the branch node. After the P2MP TE path is computed, the controller sends a label obtaining request message to the target branch node, and then receives a response message that includes the label and that is sent by the target branch node. The label obtaining request message may be used to instruct the target branch node to allocate one of at least one stored label to the target branch node in the P2MP TE path that needs to be established. In this way, a forwarding collision caused by using a same label by different protocols can be avoided.

In an embodiment, a label pre-allocated to a branch node may be stored in the controller. After the P2MP TE path is computed, the controller may allocate one of at least one stored label to the target branch node in the P2MP TE path that needs to be established. In this way, a control capability of the controller can be improved.

In an embodiment, an optimal P2MP TE path between the third node corresponding to the head node information and the node corresponding to the tail node information may be computed by using a constrained shortest path first (CSPF) algorithm, so that the P2MP TE path satisfies a service forwarding requirement.

In an embodiment, the path establishment request may further include required bandwidth, and a P2MP TE path whose bandwidth capacity is greater than or equal to the required bandwidth may be selected from the path between the third node corresponding to the head node information and the node corresponding to the tail node information, so that a P2MP TE path satisfying a bandwidth requirement can be established.

In an embodiment, the path establishment request may further include a required maximum delay, and a path whose delay is not greater than the required maximum delay may be selected from the path between the third node corresponding to the head node information and the node corresponding to the tail node information, so that a P2MP TE path satisfying a delay requirement can be established.

In an embodiment, the path establishment request may further include a link affinity attribute, and a path whose affinity attribute satisfies the link affinity attribute may be selected from the path between the third node corresponding to the head node information and the node corresponding to the tail node information, so that a P2MP TE path satisfying a link affinity attribute requirement can be established.

According to a second aspect, a controller is disclosed, where the controller includes a unit configured to perform the path establishment method disclosed in any one of the first aspect or the possible implementations of the first aspect.

According to a third aspect, a controller is disclosed, where the controller manages at least three nodes, and the controller includes a processor, a memory, and a transceiver.

The memory stores a set of program code, and the processor is configured to invoke the program code stored in the memory to perform the following operations:

when detecting a path establishment request for establishing P2MP TE, computing a P2MP TE path by using head node information and tail node information included in the path establishment request, where the P2MP TE path includes at least one branch node and at least two tail nodes; and identifying a target branch node in the P2MP TE path, and obtaining a label of the target branch node, where the target branch node is connected to at least a first node and a second node, the first node is a first tail node or the first node is a node between the target branch node and the first tail node, the second node is a second tail node or the second node is a node between the target branch node and the second tail node, the first tail node and the second tail node are nodes in the at least two tail nodes, and the target branch node is any one of the at least one branch node.

The transceiver is configured to: when a third node corresponding to the head node information and the target branch node are not a same node, send first information to the third node, and send second information to the target branch node, where the first information includes the label and information about a path from the third node to the target branch node in the P2MP TE path, the first information is used to instruct the third node to encapsulate the path information and the label to a first packet when receiving the first packet, the path information is used to instruct the third node to forward the encapsulated first packet based on the path information, the second information is used to instruct the target branch node to generate a first multicast forwarding entry, the first multicast forwarding entry includes information about a path from the target branch node to a node corresponding to the tail node information in the P2MP TE path, and the first multicast forwarding entry is used by the target branch node to forward the first packet based on the first multicast forwarding entry when receiving the first packet including the label.

According to a fourth aspect, a readable storage medium is disclosed, where the readable storage medium stores program code used by a controller to perform the path establishment method disclosed in any one of the first aspect or the possible implementations of the first aspect.

In the embodiments of this application, when establishing the P2MP TE path, the controller only needs to send information to the head node and the branch node in the P2MP TE path, and does not need to send information to all nodes in the P2MP TE path, so that complexity in a P2MP TE path establishment process can be reduced, to facilitate network management and maintenance.

BRIEF DESCRIPTION OF DRAWINGS

To describe the technical solutions in the embodiments of this application more clearly, the following briefly describes the accompanying drawings required for the embodiments. Apparently, the accompanying drawings in the following description show merely some embodiments of this application, and a person of ordinary skill in the art may derive other drawings from these accompanying drawings without creative efforts.

FIG. 8 is a schematic diagram of a PCLabelUpd message format according to an embodiment of this application;

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The embodiments of this application disclose a path establishment method and a controller, so as to reduce complexity of establishing a P2MP TE path. Details are separately described in the following.

Figure 1:
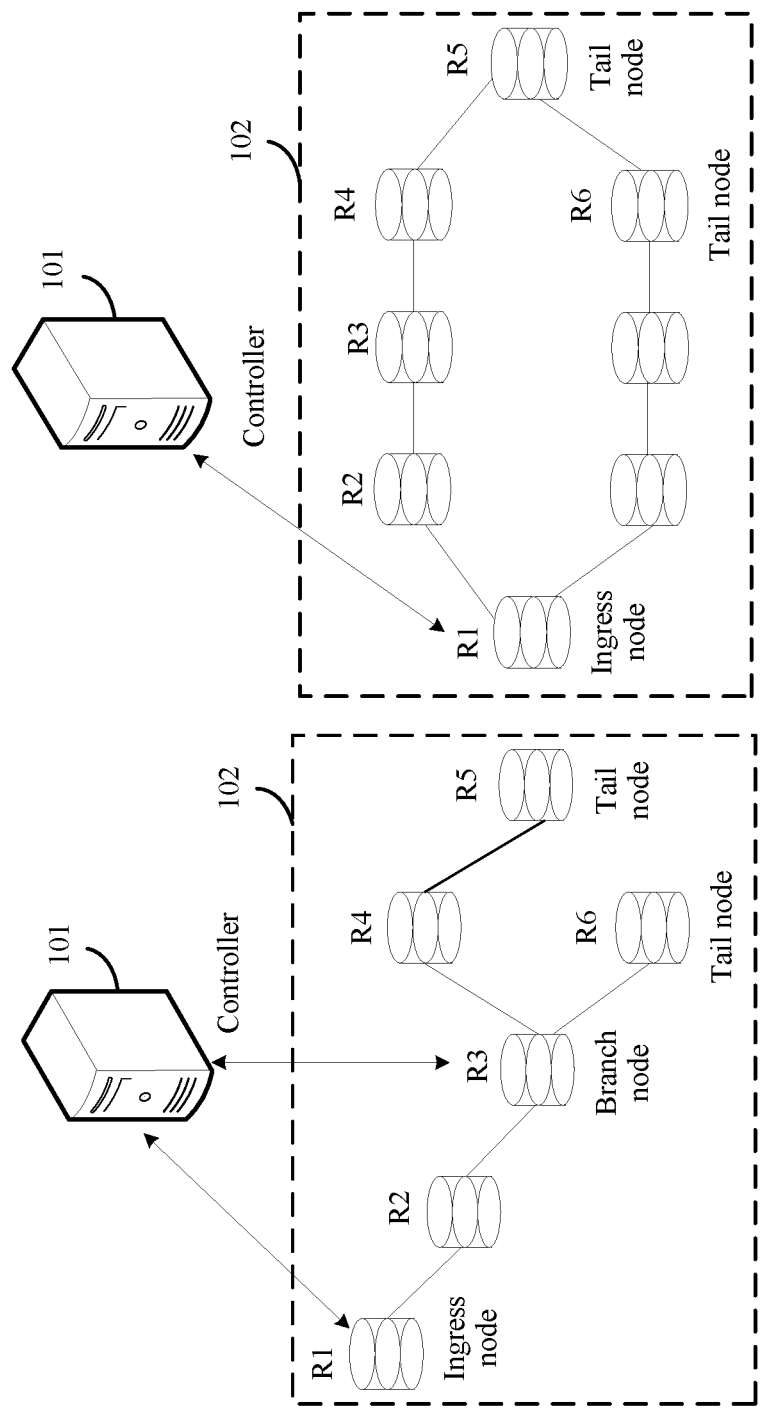
FIG. 1 is a schematic diagram of a network architecture according to an embodiment of this application.

To better understand a path establishment method and a controller according to the embodiments of this application, the following first describes a network architecture used in the embodiments of this application. Referring to FIG. 1, FIG. 1 is a schematic diagram of a network architecture according to an embodiment of this application. As shown in FIG. 1, the path establishment network architecture may include a controller 101 and a plurality of nodes 102. For example, the plurality of nodes 102 include nodes R1, R2, R3, R4, R5, R6, and the like in FIG. 1. The plurality of nodes 102 have an MPLS forwarding function and an SR function. At least one branch node (branch node) 102 and at least two tail nodes (egress node) 102 exist in the plurality of nodes 102. In addition, one head node (ingress node) 102 may exist in the plurality of nodes 102. In this case, the head node and the branch node are two different nodes. The controller 101 establishes a network connection to the head node and the branch node. In this case, the branch node establishes a network connection to at least three nodes, as shown in a left diagram in FIG. 1. Alternatively, the head node and the branch node in the plurality of nodes 102 may be a same node. The controller 101 establishes a network connection to the head node or the branch node, and the branch node is connected to at least two nodes through a network, as shown in a right diagram in FIG. 1. The controller 101 is configured to: detect a path establishment request for P2MP TE, respond to the path establishment request for the P2MP TE, compute a P2MP TE path, and send related information of the P2MP TE path to the head node and/or the branch node in P2MP TE, so that the nodes in the P2MP TE path forward a packet based on the information. The path establishment request for the P2MP TE may be sent by the head node to the controller 101, or may be generated by the controller 101, or may be sent to the controller 101 by a device other than the nodes 102 and the controller 101 in a P2MP TE network. This is not limited in this embodiment of this application.

Figure 2:
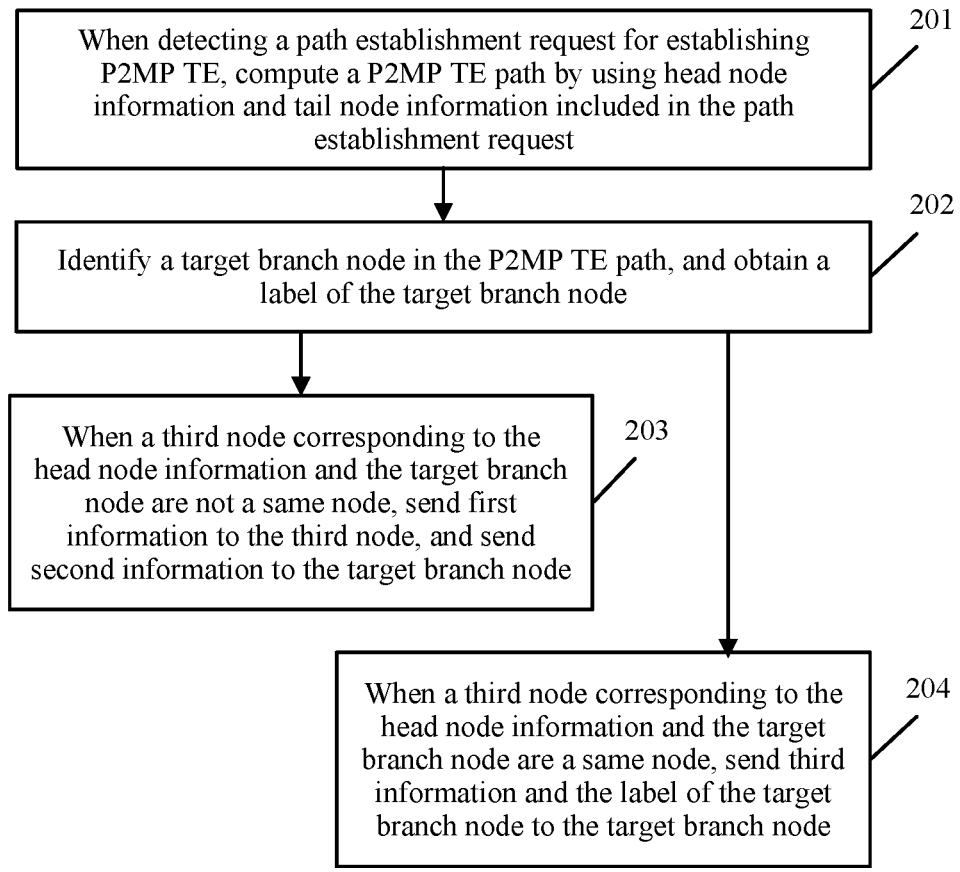
FIG. 2 is a schematic flowchart of a path establishment method according to an embodiment of this application.

Based on the network architecture shown in FIG. 1, referring to FIG. 2, FIG. 2 is a schematic flowchart of a path establishment method according to an embodiment of this application. This embodiment of this application is described from a perspective of a controller 101. As shown in FIG. 2, the path establishment method may include the following steps.

201. When detecting a path establishment request for establishing P2MP TE, compute a P2MP TE path by using head node information and tail node information included in the path establishment request.

In this embodiment, the controller (controller) may obtain a topology structure between nodes in a network in advance by using the Interior Gateway Protocol (IGP) or the Border Gateway Protocol (Border Gateway Protocol, BGP), and may obtain a label switched path (LSP) between the nodes in the network in advance by using the Path Computation Element Communication Protocol (PCEP). Therefore, when detecting the path establishment request that is for establishing the P2MP TE and that includes the head node information and the tail node information, the controller may compute the P2MP TE path based on the head node information, the tail node information, the topology structure between the nodes, and the LSP between the nodes, to be specific, compute a path between a node corresponding to the head node information and a node corresponding to the tail node information. For example, a head node is R1 in a left diagram in FIG. 1, and tail nodes are R5 and R6 in the left diagram in FIG. 1. In this case, the computed P2MP TE path may be R1-R2-R3-R4-R5 and R1-R2-R3-R6. The computed P2MP TE path may include at least one branch node and at least two tail nodes.

In a possible implementation, the controller may compute, by using a CSPF algorithm, an optimal path between the node corresponding to the head node information and the node corresponding to the tail node information, so that a packet transmission path can be optimal.

In a possible implementation, the path establishment request may further include information such as required bandwidth, a required maximum delay, and a link affinity attribute. When computing the P2MP TE path, the controller may select, from the path from the node corresponding to the head node information to the node corresponding to the tail node information, a path that satisfies at least one of the information such as the required bandwidth, the required maximum delay, and the link affinity attribute, so that the computed P2MP TE path satisfies a service requirement, and accordingly a service packet can be transmitted.

202. Identify a target branch node in the P2MP TE path, and obtain a label of the target branch node.

In this embodiment, after the P2MP TE path is computed, the target branch node in the P2MP TE path needs to be identified. To be specific, a specific node at which the P2MP TE path starts to branch needs to be identified, and the node is a branch node. The controller may send a label obtaining request to the target branch node, so that the target branch node returns the allocated label to the P2MP TE path. Alternatively, the controller may allocate the label to the P2MP TE path. This is not limited in this embodiment. The target branch node is connected to at least a first node and a second node. The first node is a first tail node or the first node is a node between the target branch node and the first tail node. The second node is a second tail node or the second node is a node between the target branch node and the second tail node. The first tail node and the second tail node are nodes in the at least two tail nodes. The target branch node is any one of the at least one branch node.

Figure 6:
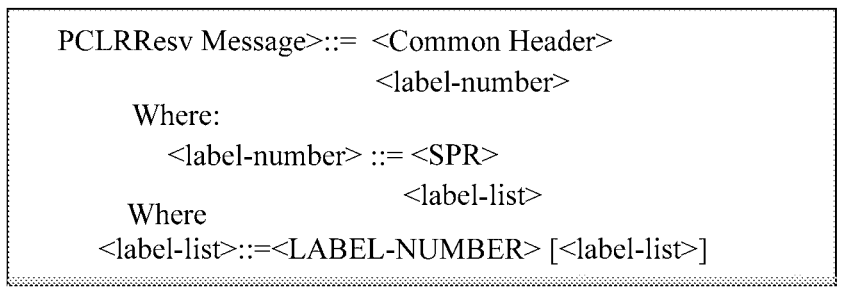
FIG. 6 is a schematic diagram of a PCLRresv message format according to an embodiment of this application.
Figure 7:
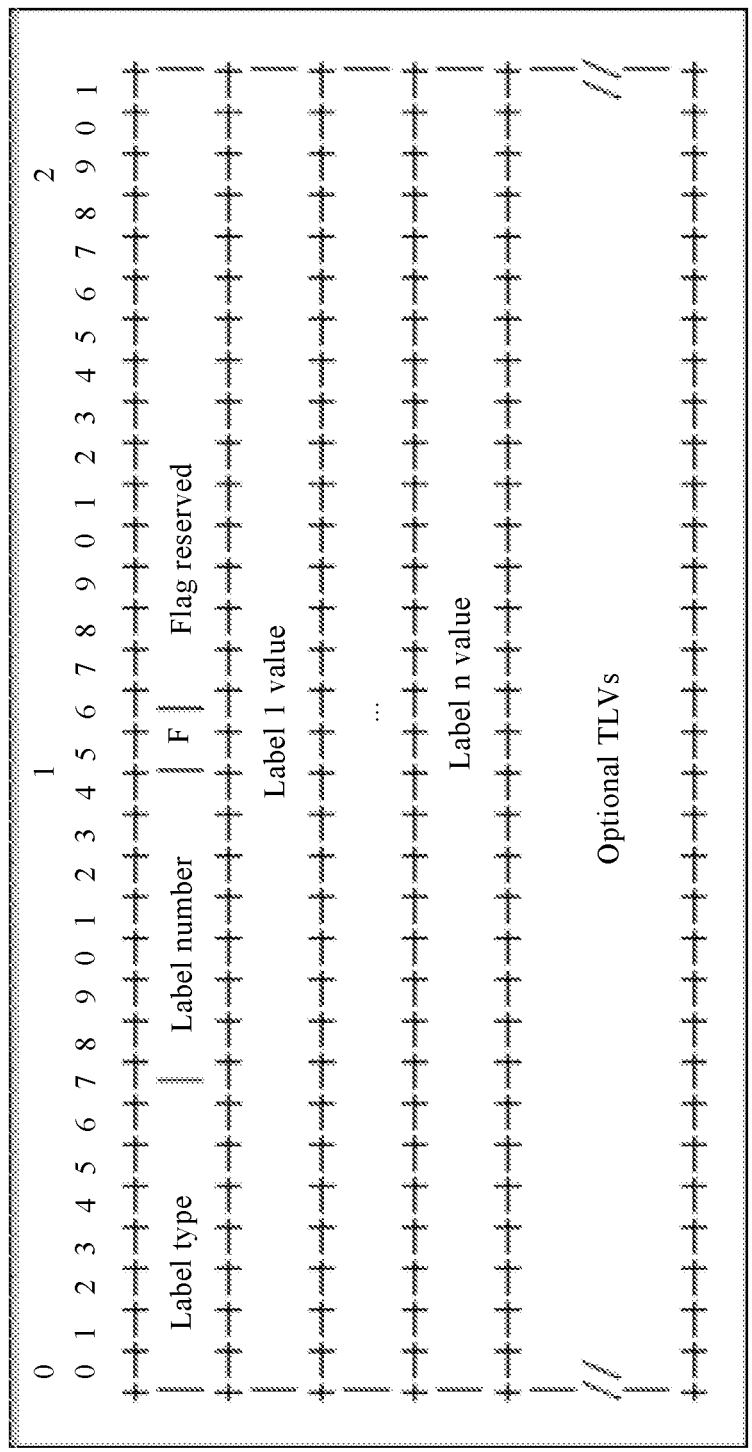
FIG. 7 is a schematic diagram of a LABEL-NUMBER format in a PCLRresv message format according to an embodiment of this application.

In this embodiment, the label of the target branch node may be allocated by the target branch node. In this case, the controller may newly add a PCLRresv message (message) by extending the Path Computation Element Communication Protocol (PCEP), to request the label of the target branch node. Referring to FIG. 6, FIG. 6 is a schematic diagram of a PCLRresv message format according to this embodiment of this application. Referring to FIG. 7, FIG. 7 is a schematic diagram of a LABEL-NUMBER format in a PCLRresv message format according to this embodiment of this application. A label type in the LABEL-NUMBER format is used to indicate that a label is a global label or a local label. When the label type is 1, it may indicate that the label is a local label. When the label type is 2, it may indicate that the label is a global label. A label number in the LABEL-NUMBER format is used to indicate a quantity of required labels. F in the LABEL-NUMBER format is used to indicate that this message is for applying for a label or returning a label. When F is set to 0, it indicates that this message is for applying for a label. When the F flag is set to 1, it indicates that this message is for returning a label. A label 1 value to a label n value in the LABEL-NUMBER format are label values returned by the target branch node to the controller.

203. When a third node corresponding to the head node information and the target branch node are not a same node, send first information to the third node, and send second information to the target branch node.

Figure 9:
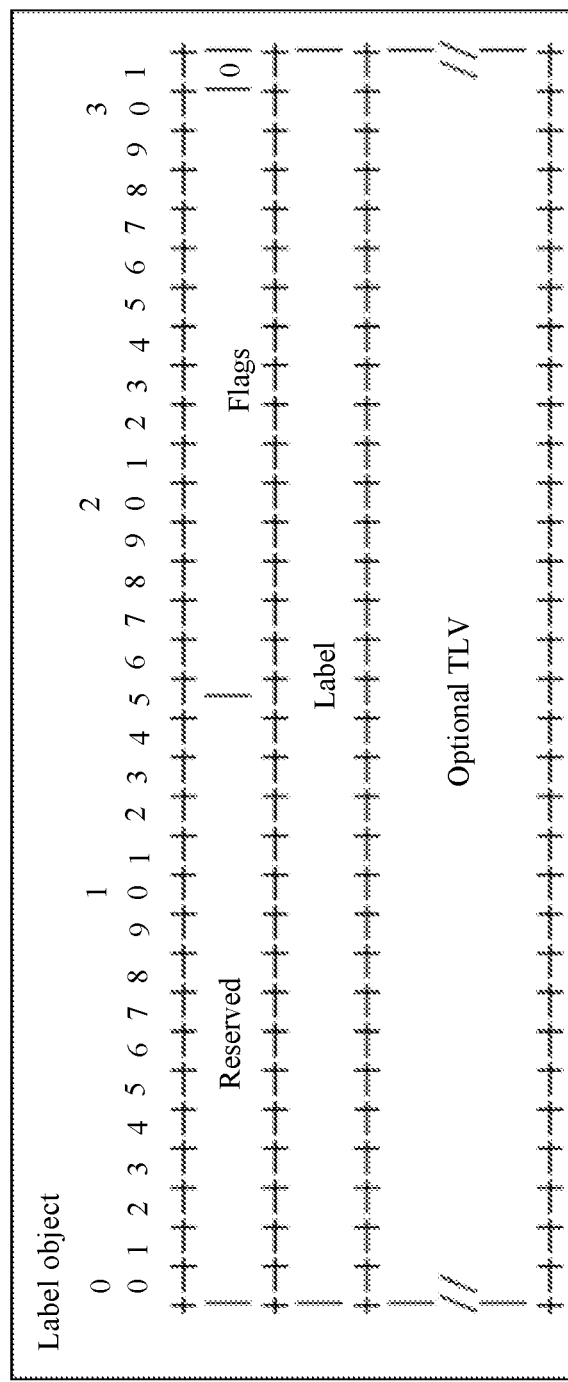
FIG. 9 is a schematic diagram of a LABEL format in a PCLabelUpd message format according to an embodiment of this application.
Figure 10:
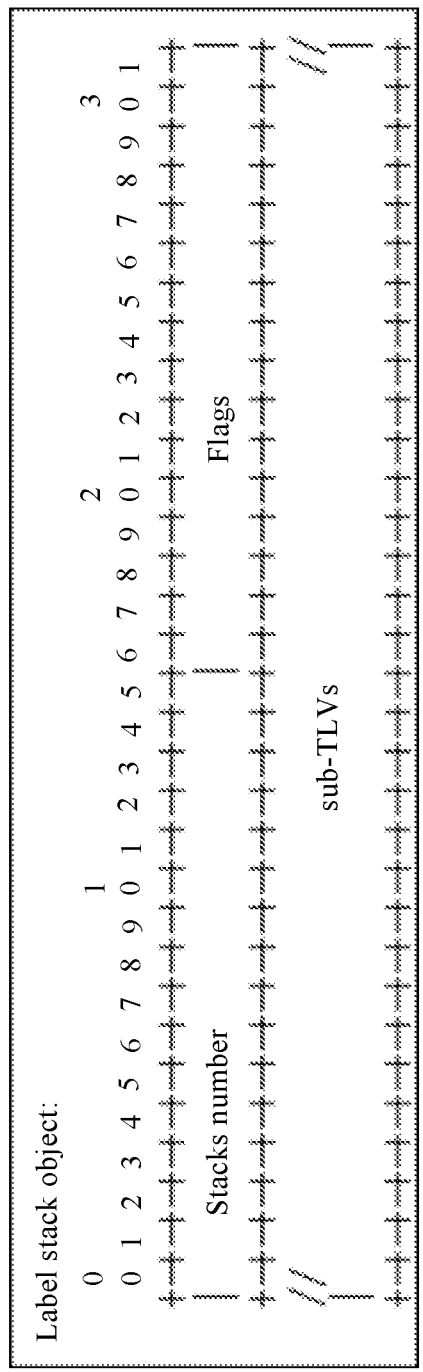
FIG. 10 is a schematic diagram of a LABEL-SATACK format in a PCLabelUpd message format according to an embodiment of this application.
Figure 11:
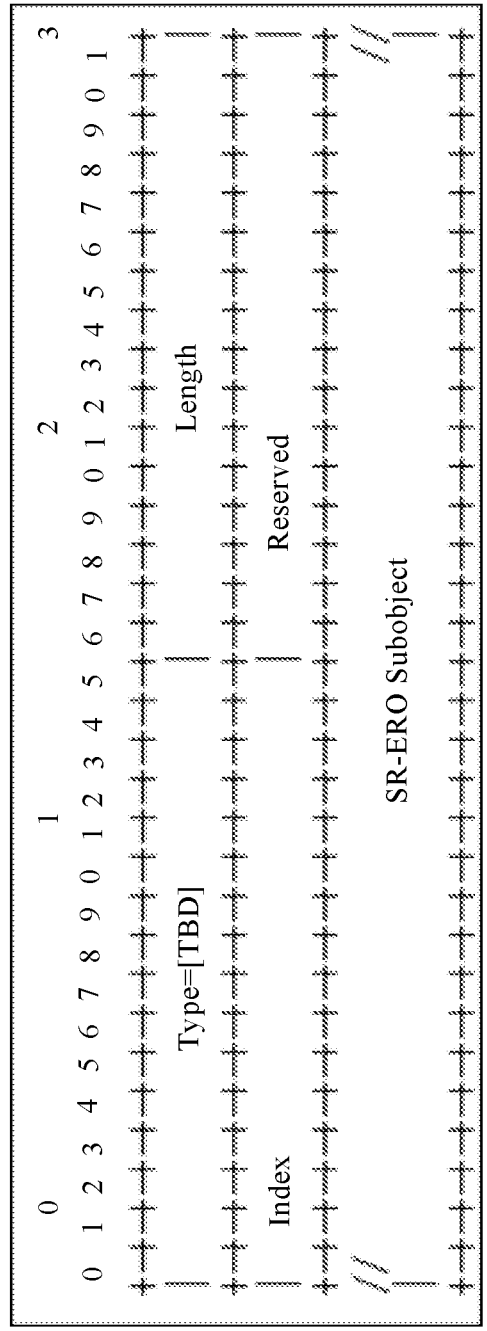
FIG. 11 is a schematic diagram of a label stack sub-TLV according to an embodiment of this application.

In this embodiment, the controller may newly add a PCLabelUpd message by extending the PCEP protocol, to deliver the first information to the third node and deliver the second information to the target branch node. Referring to FIG. 8, FIG. 8 is a schematic diagram of a PCLabelUpd message format according to this embodiment of this application. Referring to FIG. 9, FIG. 9 is a schematic diagram of a LABEL format in a PCLabelUpd message format according to this embodiment of this application. An 0 bit in the LABEL format is used to indicate a type of a label. When the flag bit is set to 1, it indicates that the label is an egress label. When the flag bit is not set to 1, it indicates that the label is an ingress label. Referring to FIG. 10, FIG. 10 is a schematic diagram of a LABEL-ATACK format in a PCLabelUpd message format according to this embodiment of this application. A stacks number in the LABEL-ATACK format is used to indicate label stack data. Referring to FIG. 11, FIG. 11 is a schematic diagram of a label stack sub-TLV according to this embodiment of this application. An index in the label stack sub-TLV is used to indicate a sequence number of a label stack.

In this embodiment, after the label of the target branch node is obtained, the first information is sent to the third node when the third node corresponding to the head node information and the target branch node are not a same node, that is, when a head node is not a branch node. The first information may include the label of the target branch node and information about a path from the third node to the target branch node in the P2MP TE path. The first information may be used to instruct the third node to encapsulate the path information and the label of the target branch node in a first packet when receiving the first packet. The label of the target branch node is after the path information in the encapsulated first packet. The path information may be used to instruct the third node to forward the encapsulated first packet based on the path information. The first information may be sent to the third node by using a label stack. For example, in the left diagram in FIG. 1, a label stack sent by the controller to the head node R1 may be {L12 L23 L3N}, where L3N is a label of a branch node R3, and L12 and L23 may indicate a path from the head node R1 to the branch node R3 in the P2MP TE path. To be specific, a packet forwarding path is node R1-node R2-node R3. In addition, the second information is sent to the target branch node. The second information may be used to instruct the target branch node to generate a first multicast forwarding entry. The first multicast forwarding entry may include information about a path from the target branch node to a node corresponding to the tail node information in the P2MP TE path. The first multicast forwarding entry may be used by the target branch node to forward the first packet based on the first multicast forwarding entry when receiving the first packet including the label of the target branch node. To be specific, the first packet is duplicated for a quantity of paths included in the first multicast forwarding entry, and each first packet is forwarded based on one path included in the first multicast forwarding entry. For example, there is a path from the node R3 to the tail node R5 and a path from the node R3 to the node R6. Therefore, after receiving a packet including L3N, the node R3 may make two copies of the packet, then forwards the packet to the node R5 based on R3-R4-R5, and forwards the packet to the node R6 based on R3-R6. The first information and the second information are respectively delivered to the third node and the target branch node by using PCLabelUpd messages.

204. When a third node corresponding to the head node information and the target branch node are a same node, send third information and the label of the target branch node to the target branch node.

In this embodiment, when the third node corresponding to the head node information and the target branch node are a same node, the label of the target branch node and the third information are delivered to the target branch node by using a PCLabelUpd message. The label of the target branch node may be used to instruct the target branch node to generate a second multicast forwarding entry based on the third information. The second multicast forwarding entry may include information about a path from the target branch node to a node corresponding to the tail node information in the P2MP TE path. The second multicast forwarding entry may be used by the target branch node to forward a second packet based on the second multicast forwarding entry when receiving the second packet. To be specific, the second packet is duplicated for a quantity of paths included in the second multicast forwarding entry, and each second packet is forwarded based on one path included in the second multicast forwarding entry. The third information may further include information used to indicate that the target branch node is an ingress node, to indicate that the target branch node is the ingress node.

In the path establishment method described in FIG. 2, when the path establishment request for establishing the P2MP TE is detected, the P2MP TE path is computed by using the head node information and the tail node information included in the path establishment request; the target branch node in the P2MP TE path is identified, and the label of the target branch node is obtained; and when the third node corresponding to the head node information and the target branch node are not a same node, the first information is sent to the third node, and the second information is sent to the target branch node; or when the third node corresponding to the head node information and the target branch node are a same node, the third information and the label of the target branch node are sent to the target branch node. It can be learned that, when establishing the P2MP TE path, the controller only needs to send information to the head node and/or the branch node in the P2MP TE path, and does not need to send information to all nodes in the P2MP TE path, so that complexity in a P2MP TE path establishment process can be reduced, to facilitate network management and maintenance.

Figure 3:
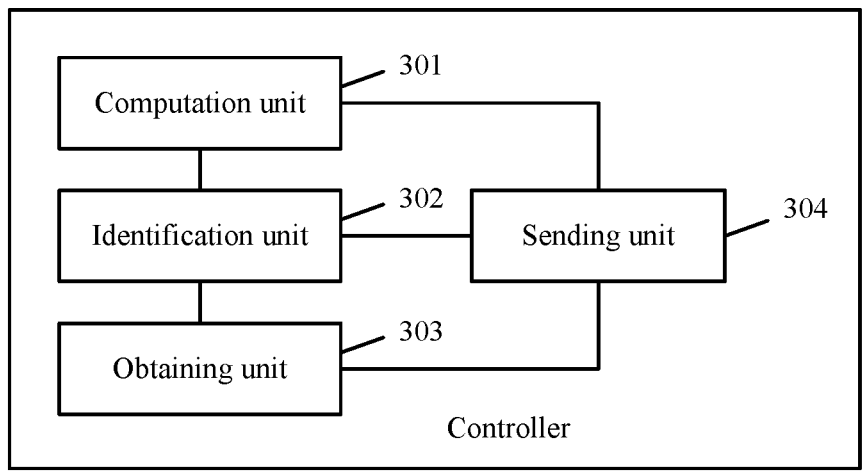
FIG. 3 is a schematic structural diagram of a controller according to an embodiment of this application.

Based on the network architecture shown in FIG. 1, referring to FIG. 3, FIG. 3 is a schematic structural diagram of a controller according to an embodiment of this application. The controller may be a controller in the embodiment shown in FIG. 2. As shown in FIG. 3, the controller may include:

- a computation unit 301, configured to: when a path establishment request for establishing P2MP TE is detected, compute a P2MP TE path by using head node information and tail node information included in the path establishment request, where the P2MP TE path includes at least one branch node and at least two tail nodes;
- an identification unit 302, configured to identify a target branch node in the P2MP TE path computed by the computation unit 301, where the target branch node is connected to at least a first node and a second node, the first node is a first tail node or the first node is a node between the target branch node and the first tail node, the second node is a second tail node or the second node is a node between the target branch node and the second tail node, the first tail node and the second tail node are nodes in the at least two tail nodes, and the target branch node is any one of the at least one branch node;
- an obtaining unit 303, configured to obtain a label of the target branch node identified by the identification unit 302; and
- a sending unit 304, configured to: when a third node corresponding to the head node information and the target branch node are not a same node, send first information to the third node, and send second information to the target branch node identified by the identification unit 302, where the first information includes the label obtained by the obtaining unit 303 and information about a path from the third node to the target branch node in the P2MP TE path computed by the computation unit, the first information is used to instruct the third node to encapsulate the path information and the label of the target branch node in a first packet when receiving the first packet, the path information is used to instruct the third node to forward the encapsulated first packet based on the path information, the second information is used to instruct the target branch node to generate a first multicast forwarding entry, the first multicast forwarding entry includes information about a path from the target branch node to a node corresponding to the tail node information in the P2MP TE path, and the first multicast forwarding entry is used by the target branch node to forward the first packet based on the first multicast forwarding entry when receiving the first packet including the label of the target branch node.

In a possible implementation, the sending unit 304 is further configured to: when the third node corresponding to the head node information and the target branch node are a same node, send third information and the label of the target branch node that is obtained by the obtaining unit 303 to the target branch node identified by the identification unit 302. The label of the target branch node is used to instruct the target branch node to generate a second multicast forwarding entry based on the third information. The second multicast forwarding entry includes information about a path from the target branch node to a node corresponding to the tail node information in the P2MP TE path computed by the computation unit. The second multicast forwarding entry is used by the target branch node to forward a second packet based on the second multicast forwarding entry when receiving the second packet.

In a possible implementation, the obtaining unit 303 is specifically configured to:
send a label obtaining request message to the target branch node, where the label obtaining request message is used to instruct the target branch node to allocate the label to the P2MP TE path; and
receive a response message sent by the target branch node, where the response message includes the label.

In a possible implementation, the obtaining unit 303 is specifically configured to allocate the label to the target branch node.

In a possible implementation, the computation unit 301 is specifically configured to compute, by using a constrained shortest path first CSPF algorithm, the P2MP TE path between the third node corresponding to the head node information and the node corresponding to the tail node information.

In the controller described in FIG. 3, when the path establishment request for establishing the P2MP TE is detected, the P2MP TE path is computed by using the head node information and the tail node information included in the path establishment request; the target branch node in the P2MP TE path is identified, and the label of the target branch node is obtained; and when the third node corresponding to the head node information and the target branch node are not a same node, the first information is sent to the third node, and the second information is sent to the target branch node; or when the third node corresponding to the head node information and the target branch node are a same node, the third information and the label of the target branch node are sent to the target branch node. It can be learned that, when establishing the P2MP TE path, the controller only needs to send information to a head node and/or a branch node in the P2MP TE path, and does not need to send information to all nodes in the P2MP TE path, so that complexity in a P2MP TE path establishment process can be reduced, to facilitate network management and maintenance.

Figure 4:
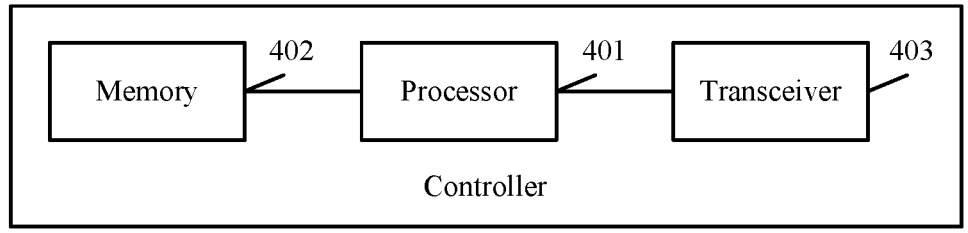
FIG. 4 is a schematic structural diagram of another controller according to an embodiment of this application.

Based on the network architecture shown in FIG. 1, referring to FIG. 4, FIG. 4 is a schematic structural diagram of another controller according to an embodiment of this application. The controller may be a controller in the embodiment shown in FIG. 2. As shown in FIG. 4, the controller may include a processor 401, a memory 402, and a transceiver 403.

The memory 402 stores a set of program code, and the processor 401 is configured to invoke the program code stored in the memory 402 to perform the following operations:
when detecting a path establishment request for establishing point-to-multipoint traffic engineering P2MP TE, computing a P2MP TE path by using head node information and tail node information included in the path establishment request, where the P2MP TE path includes at least one branch node and at least two tail nodes; and
identifying a target branch node in the P2MP TE path, and obtaining a label of the target branch node, where the target branch node is connected to at least a first node and a second node, the first node is a first tail node or the first node is a node between the target branch node and the first tail node, the second node is a second tail node or the second node is a node between the target branch node and the second tail node, the first tail node and the second tail node are nodes in the at least two tail nodes, and the target branch node is any one of the at least one branch node.

The transceiver 403 is configured to: when a third node corresponding to the head node information and the target branch node are not a same node, send first information to the third node, and send second information to the target branch node. The first information includes the label of the target branch node and information about a path from the third node to the target branch node in the P2MP TE path. The first information is used to instruct the third node to encapsulate the path information and the label of the target branch node in a first packet when receiving the first packet. The path information is used to instruct the third node to forward the encapsulated first packet based on the path information. The second information is used to instruct the target branch node to generate a first multicast forwarding entry. The first multicast forwarding entry includes information about a path from the target branch node to a node corresponding to the tail node information in the P2MP TE path. The first multicast forwarding entry is used by the target branch node to forward the first packet based on the first multicast forwarding entry when receiving the first packet including the label of the target branch node.

In a possible implementation, the transceiver 503 is further configured to: when the third node corresponding to the head node information and the target branch node are a same node, send third information and the label of the target branch node to the target branch node. The label of the target branch node is used to instruct the target branch node to generate a second multicast forwarding entry based on the third information. The second multicast forwarding entry includes information about a path from the target branch node to a node corresponding to the tail node information in the P2MP TE path. The second multicast forwarding entry is used by the target branch node to forward a second packet based on the second multicast forwarding entry when receiving the second packet.

In a possible implementation, that the processor 401 obtains a label of the target branch node includes:

The transceiver 403 sends a label obtaining request message to the target branch node, where the label obtaining request message is used to instruct the target branch node to allocate the label to the P2MP TE path.

The transceiver 403 receives a response message sent by the target branch node, where the response message includes the label.

In a possible implementation, that the processor 401 obtains a label of the target branch node includes:

The processor 401 allocates the label to the target branch node.

In a possible implementation, that the processor 401 computes a P2MP TE path by using head node information and tail node information included in the path establishment request includes:

The processor 401 computes, by using a constrained shortest path first CSPF algorithm, the P2MP TE path between the third node corresponding to the head node information and the node corresponding to the tail node information.

Steps 201 and 202 may be performed by the processor 401 in the controller by invoking the program code stored in the memory 402, and step 203 and step 204 may be performed by the transceiver 403 in the controller.

The computation unit 301, the identification unit 302, and the obtaining unit 303 may be implemented by the processor 401 and the memory 402 in the controller, and the sending unit 304 may be implemented by the transceiver 403 in the controller.

In the controller described in FIG. 4, when the path establishment request for establishing the P2MP TE is detected, the P2MP TE path is computed by using the head node information and the tail node information included in the path establishment request; the target branch node in the P2MP TE path is identified, and the label of the target branch node is obtained; and when the third node corresponding to the head node information and the target branch node are not a same node, the first information is sent to the third node, and the second information is sent to the target branch node; or when the third node corresponding to the head node information and the target branch node are a same node, the third information and the label of the target branch node are sent to the target branch node. It can be learned that, when establishing the P2MP TE path, the controller only needs to send information to a head node and/or a branch node in the P2MP TE path, and does not need to send information to all nodes in the P2MP TE path, so that complexity in a P2MP TE path establishment process can be reduced, to facilitate network management and maintenance.

Figure 5:
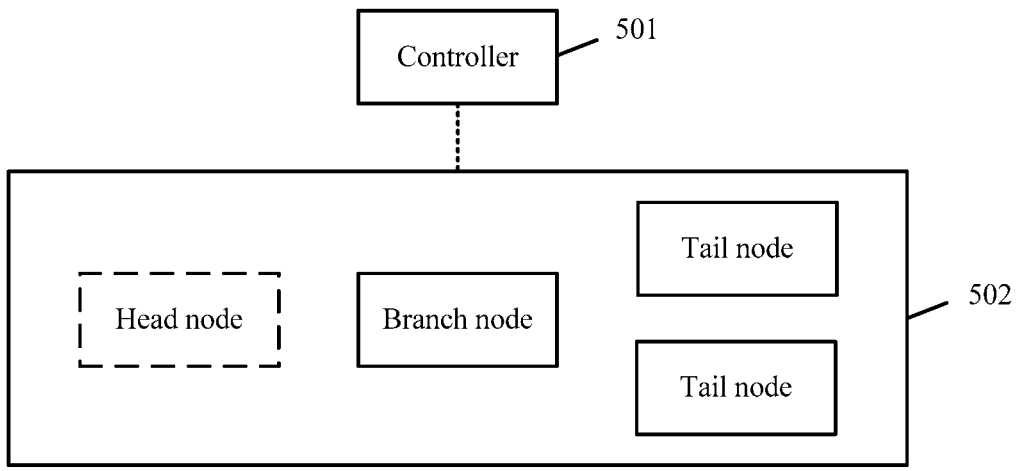
FIG. 5 is a schematic structural diagram of a path establishment system according to an embodiment of this application.

Based on the network architecture shown in FIG. 1, referring to FIG. 5, FIG. 5 is a schematic structural diagram of a path establishment system according to an embodiment of this application. As shown in FIG. 5, the path establishment system includes a controller 501 and at least three nodes 502.

The controller 501 is configured to: when detecting a path establishment request for establishing P2MP TE, compute a P2MP TE path by using head node information and tail node information included in the path establishment request, identify a target branch node in the P2MP TE path, and obtain a label of the target branch node. The P2MP TE path includes at least one branch node and at least two tail nodes. The target branch node is connected to at least a first node and a second node. The first node is a first tail node or the first node is a node between the target branch node and the first tail node. The second node is a second tail node or the second node is a node between the target branch node and the second tail node. The first tail node and the second tail node are nodes in the at least two tail nodes. The target branch node is any one of the at least one branch node.

The controller 501 is further configured to: when a third node corresponding to the head node information and the target branch node are not a same node, send first information to the third node, and send second information to the target branch node. The first information includes the label of the target branch node and information about a path from the third node to the target branch node in the P2MP TE path.

The third node 502 is configured to: receive the first information, receive a first packet, encapsulate the path information and the label of the target branch node in the first packet, and forward the encapsulated first packet to the target branch node based on the path information. The label of the target branch node is after the path information in the encapsulated first packet.

The target branch node 502 is configured to: receive the second information, generate a first multicast forwarding entry, receive the first packet including the label of the target branch node, and forward the first packet based on information, included in the first multicast forwarding entry, about a path from the target branch node to a node corresponding to the tail node information in the P2MP TE path.

In a possible implementation, the controller 501 is further configured to: when the third node corresponding to the head node information and the target branch node are a same node, send third information and the label of the branch node to the target branch node.

The target branch node 502 is further configured to: generate a second multicast forwarding entry under an indication of the label of the target branch node based on the third information, receive a second packet, and forward the second packet based on information, included in the second multicast forwarding entry, about a path from the target branch node to a node corresponding to the tail node information in the P2MP TE path.

In a possible implementation, that the controller 501 obtains a label of the target branch node includes:

The controller 501 sends a label obtaining request message to the target branch node 502.

The target branch node 502 allocates the label to the P2MP TE path, and sends the label to the controller 501.

The controller 501 receives the label sent by the target branch node 502.

In a possible implementation, that the controller 501 obtains a label of the target branch node 502 includes:

allocating the label to the target branch node 502.

In a possible implementation, that the controller 501 computes a P2MP TE path by using head node information and tail node information included in the path establishment request includes:

computing, by using a constrained shortest path first CSPF algorithm, the P2MP TE path between the third node corresponding to the head node information and the node corresponding to the tail node information.

A head node may be indicated by using a dashed-line box, to indicate that the head node and a branch node may be a same node or different nodes.

In the path establishment system described in FIG. 5, when the path establishment request for establishing the P2MP TE is detected, the P2MP TE path is computed by using the head node information and the tail node information included in the path establishment request; the target branch node in the P2MP TE path is identified, and the label of the target branch node is obtained; and when the third node corresponding to the head node information and the target branch node are not a same node, the first information is sent to the third node, and the second information is sent to the target branch node; or when the third node corresponding to the head node information and the target branch node are a same node, the third information and the label of the target branch node are sent to the target branch node. It can be learned that, when establishing the P2MP TE path, the controller only needs to send information to a head node and/or a branch node in the P2MP TE path, and does not need to send information to all nodes in the P2MP TE path, so that complexity in a P2MP TE path establishment process can be reduced, to facilitate network management and maintenance.

In an embodiment, a readable storage medium is disclosed. The readable storage medium stores program code used by a command distribution apparatus to perform the path establishment method corresponding to FIG. 2 in the embodiments of this application.

A person of ordinary skill in the art may understand that all or a part of the steps of the methods in the embodiments may be implemented by a program instructing related hardware. The program may be stored in a computer readable storage medium. The storage medium may include a flash memory, a read-only memory (ROM), a random access memory (RAM), a magnetic disk, an optical disk, or the like.

Clause 1. A path establishment method implemented by a controller, the method comprising:
  computing a point-to-multipoint traffic engineering (P2MP TE) path comprising at least one branch node and at least two tail nodes;
  obtaining a label of a target branch node of the at least one branch node, wherein the target branch node is at least connected to a first node and a second node along the P2MP TE path; and
  sending a first information comprising the label to the target branch node, the first information is used to instruct the target branch node to generate a first multicast forwarding entry, the first multicast forwarding entry comprises information about a path from the target branch node to the at least two tail nodes, and the first multicast forwarding entry is used by the target branch node to forward the first packet comprising the label.

Clause 2. The method according to Clause 1, wherein the target branch node is a head node of the P2MP TE path.

Clause 3. The method according to Clause 2, wherein the first information further comprising information indicating that the target branch node is the head node.

Clause 4. The method according to any one of Clauses 1 to 3, wherein the method further comprising:
  sending a second information to a head node of the P2MP TE path, wherein the second information comprising the label and path information about a path from the head node to the target branch node.

Clause 5. The method according to Clause 4, wherein the second information is used to instruct the head node to encapsulate the path information and the label of the target branch node in a received packet.

Clause 6. The method according to any one of Clauses 1 to 5, wherein the method further comprising:
  obtaining the label of the target branch node from the target branch node.

Clause 7. The method according to Clause 6, wherein the obtaining the label of the target branch node, comprises:
  receiving a message from the target branch node, wherein the message comprising the label allocated by the target branch node.

Clause 8. The method according to Clause 7, wherein the method further comprising:
  sending a message to the target branch node to instruct the target branch node to allocate the label.

Clause 9. The method according to Clause 1, wherein the obtaining the label of the target branch node comprises:
  allocating the label to the target branch node.

Clause 10. The method according to any one of Clauses 1 to 9, wherein the computing, by the controller, the P2MP TE path comprises:
  computing the P2MP TE path by using head node information and tail node information comprised in a path establishment request.

Clause 11. The method according to any one of Clauses 1 to 10, wherein the computing, by the controller, the P2MP TE path comprises:
  computing by using a constrained shortest path first CSPF algorithm, the P2MP TE path.

Clause 12. A controller managing at least three nodes comprises:
  a memory comprising instructions; and
  a processor coupled to the memory, wherein the processor is configured to execute the instructions to:
    compute a point-to-multipoint traffic engineering (P2MP TE) path comprising at least one branch node and at least two tail nodes;
    obtain a label of a target branch node of the at least one branch node, wherein the target branch node is at least connected to a first node and a second node along the P2MP TE path; and
    send a first information comprising the label to the target branch node, the first information is used to instruct the target branch node to generate a first multicast forwarding entry, the first multicast forwarding entry comprises information about a path from the target branch node to the at least two tail nodes, and the first multicast forwarding entry is used by the target branch node to forward the first packet comprising the label.

Clause 13. The controller according to Clause 12, wherein the target branch node is a head node of the P2MP TE path.

Clause 14. The controller according to Clause 13, wherein the first information further comprising information indicating that the target branch node is the head node.

Clause 15. The controller according to Clause 12, wherein the processor is configured to execute the instructions to:
  send a second information to a head node of the P2MP TE path, wherein the second information comprising the label and path information about a path from the head node to the target branch node.

Clause 16. The controller according to any one of Clauses 12 to 15, wherein the processor is configured to execute the instructions to:
  obtain the label of the target branch node from the target branch node.

Clause 17. The controller according to Clause 16, wherein the processor is configured to execute the instructions to:
  send a message to the target branch node to instruct the target branch node to allocate the label. Alternatively, the message is a response message in response to a request message sent by the controller.

Clause 17. The controller according to Clause 16, wherein the processor is configured to execute the instructions to:
send the request message to instruct the target branch node to allocate the label.

Clause 18. The controller according to any one of Clauses 12 to 15, wherein the processor is configured to execute the instructions to:
allocate the label to the target branch node.

Clause 19. A controller, configured to implement any one of the method of Clauses 1 to 11.

Clause 20. A non-transitory computer-readable storage medium storing instructions for establishing a path for a controller, the instructions, when executed by a computer, cause the computer to carry out any one of the methods of Clauses 1 to 11. The path establishment method and the controller according to the embodiments of this application are described in detail above. The principles and implementations of this application are described in this specification by using specific examples. The description of the foregoing embodiments is merely intended to help understand the method and core ideas of this application. In addition, with respect to the implementations and the application scope, modifications may be made by a person of ordinary skill in the art according to the idea of this application. Therefore, the content of this specification shall not be construed as a limitation on this application.

The invention claimed is:

1. A communication method implemented by a target branch node along a point to multipoint traffic engineering (P2MP TE) path, the method comprising:
receiving, from a controller, first information comprising a label of the target branch node;
generating a multicast forwarding entry based on the first information, the multicast forwarding entry comprises second information about a first path from the target branch node to at least two tail nodes; and
forwarding, by using the multicast forwarding entry, a packet comprising the label.

2. The method according to claim 1, wherein the target branch node is a head node of the P2MP TE path.

3. The method according to claim 2, wherein the first information further comprises third information indicating that the target branch node is the head node.

4. The method according to claim 1, further comprising:
sending, to the controller, the label of the target branch node.

5. The method according to claim 4, wherein the sending the label of the target branch node, comprises:
sending a message to the controller, wherein the message comprises the label allocated by the target branch node.

6. The method according to claim 5, further comprising:
receiving a message from the controller, wherein the message instructs the target branch node to allocate the label.

7. The method according to claim 1, wherein the receiving the first information from the controller, comprises:
receiving, from the controller, a Path Computation Element Communication Protocol (PCEP) message comprising the first information.

8. The method according to claim 7, wherein the PCEP message comprises information indicating a type of the label.

9. A network device, applied as a target branch node along a point to multipoint traffic engineering (P2MP TE) path, the network device comprising:
a memory storing instructions; and
a processor coupled to the memory and configured to execute the instructions to cause the network device to:
receive, from a controller, first information comprising a label of the target branch node;
generate a multicast forwarding entry based on the first information, the multicast forwarding entry comprises second information about a first path from the target branch node to the at least two tail nodes; and
forward, by using the multicast forwarding entry, a packet comprising the label.

10. The network device according to claim 9, wherein the target branch node is a head node of the P2MP TE path.

11. The network device according to claim 10, wherein the first information further comprises information indicating that the target branch node is the head node.

12. The network device according to claim 9, wherein when the processor executes the instructions, the processor further causes the network device to:
send the label of the target branch node to the controller.

13. The network device according to claim 12, wherein when the processor executes the instructions, the processor further causes the network device to:
receive, from the controller, a message which instructs the target branch node to allocate the label.

14. The network device according to claim 9, wherein when the processor executes the instructions, the processor further causes the network device to:
receiving, from the controller, a Path Computation Element Communication Protocol (PCEP) message comprising the first information comprising the label to the target branch node.

15. The network device according to claim 14, wherein the target branch node is a node between a head node and the at least two tail nodes along the P2MP TE path.

16. The network device according to claim 14, wherein the PCEP message comprises information indicating a type of the label.

17. A non-transitory computer-readable storage medium storing instructions for forwarding packets for a target branch node along a point-to-multipoint traffic engineering (P2MP TE) path, the instructions, when executed by a computer, cause the computer to carry out steps comprising:
receiving, from a controller, first information comprising a label of the target branch node;
generating a multicast forwarding entry based on the first information, the multicast forwarding entry comprises second information about a first path from the target branch node to at least two tail nodes; and
forwarding, by using the multicast forwarding entry, a packet comprising the label.

18. The non-transitory computer-readable storage medium according to claim 17, wherein the instructions, when executed by the computer, further cause the computer to carry out steps comprising:
receiving, from the controller, a Path Computation Element Communication Protocol (PCEP) message comprising the first information comprising the label to the target branch node.

19. The non-transitory computer-readable storage medium according to claim 17, wherein the target branch node is a head node of the P2MP TE path.

20. The non-transitory computer-readable storage medium according to claim 17, wherein the target branch node is a node between a head node and the at least two tail nodes along the P2MP TE path.

\* \* \* \* \*